(12) United States Patent
Klinger

(10) Patent No.: US 11,385,369 B2
(45) Date of Patent: Jul. 12, 2022

(54) THREE-DIMENSIONAL, STRATIGRAPHICALLY-CONSISTENT SEISMIC ATTRIBUTES

(71) Applicant: Schlumberger Technology Corporation, Sugar Land, TX (US)

(72) Inventor: Jimmy Klinger, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 914 days.

(21) Appl. No.: 15/773,884

(22) PCT Filed: Nov. 3, 2016

(86) PCT No.: PCT/EP2016/076518
§ 371 (c)(1),
(2) Date: May 4, 2018

(87) PCT Pub. No.: WO2017/076951
PCT Pub. Date: May 11, 2017

(65) Prior Publication Data
US 2018/0313966 A1    Nov. 1, 2018

(30) Foreign Application Priority Data
Nov. 4, 2015    (FR) ...................................... 1560583

(51) Int. Cl.
*G01V 1/28*    (2006.01)
*G01V 1/30*    (2006.01)
*G01V 99/00*    (2009.01)

(52) U.S. Cl.
CPC ................ *G01V 1/282* (2013.01); *G01V 1/30* (2013.01); *G01V 1/301* (2013.01); *G01V 1/302* (2013.01);
(Continued)

(58) Field of Classification Search
CPC ........ G01V 1/282; G01V 1/301; G01V 1/302; G01V 2210/63
(Continued)

(56) References Cited

U.S. PATENT DOCUMENTS 6,070,125 A    5/2000   Murphy et al.
8,498,845 B2   7/2013   Jing et al.
(Continued)

OTHER PUBLICATIONS

Pitas et al., "Texture Analysis and Segmentation of Seismic Traces", 1989, pp. 1437-1440. (Year: 1989).*
(Continued)

*Primary Examiner* — Michael P Nghiem
(74) *Attorney, Agent, or Firm* — Christopher M. Mooney

(57) ABSTRACT

Methods, systems, and computer-readable media for processing seismic data. The method includes receiving a plurality of seismic traces representing a subterranean domain, and receiving an implicit stratigraphic model of at least a portion of the subterranean domain. The method also includes selecting an iso-value in the implicit stratigraphic model, and defining, using a processor, a geologically-consistent interval in the implicit stratigraphic model based at least partially on a position of the iso-value in the implicit stratigraphic model. The method further includes calculating one or more attributes of the plurality of seismic traces in the interval.

16 Claims, 6 Drawing Sheets

(52) U.S. Cl.
  CPC ........ *G01V 99/005* (2013.01); *G01V 2210/62* (2013.01); *G01V 2210/63* (2013.01); *G01V 2210/64* (2013.01); *G01V 2210/641* (2013.01); *G01V 2210/642* (2013.01); *G01V 2210/643* (2013.01)

(58) Field of Classification Search
  USPC .......................................................... 702/14
  See application file for complete search history.

(56) References Cited

U.S. PATENT DOCUMENTS

| | | | |
|---|---|---|---|
| 2012/0261135 A1* | 10/2012 | Nowak | G01V 1/301 166/369 |
| 2013/0238297 A1 | 9/2013 | Lepage et al. | |
| 2014/0222403 A1* | 8/2014 | Lepage | G01V 99/005 703/6 |
| 2015/0066460 A1 | 3/2015 | Klinger et al. | |
| 2016/0070012 A1* | 3/2016 | Rutten | G01V 1/301 702/16 |
| 2021/0223428 A1* | 7/2021 | Li | G06N 20/00 |

OTHER PUBLICATIONS

Cauman et al. ("Three-Dimensional Implicit Stratigraphic Model Building From Remote Sensing Data on Tetrahedral Meshes: Theory and Application to a Regional Model of La Popa Basin, NE Mexico"), IEEE Transactions on Geoscience and Remote Sensing, vol. 51, No. 3, pp. 1613-1621. (Year: 2013).*

Souche, et al., "Volume Based Modeling-Automated Construction of Complex Structural Models," 75th EAGE Conference & Exhibition Incorporating SPE Europec 2013, London, UK, Jun. 10-13, 2013.

Souche, et al., "Construction of Structurally and Stratigraphically Consistent Structural Models Using the Volume-Based Modelling Technology: Applictions to an Australian Dataset," International Petroleum Technology Conference, Dec. 10-12, Kuala Lumpur, Malysia, Dec. 10, 2014, pp. 1-12.

International Search Report and Written Opinion for the equivalent International patent application PCT/EP2016/076518 dated Dec. 19, 2016.

International Preliminary Report on Patentability for the equivalent International patent application PCT/EP2016/076518 dated May 17, 2018.

Buatois et al., "GPU Accelerated Isosurface Extraction on Tetrahedral Grids," (2006), 10 pages.

Wald et al., "Interactive Isosurface Ray Tracing of Time-Varying Tetrahedral Volumes," (Nov. 2007), 8 pages.

* cited by examiner

THREE-DIMENSIONAL, STRATIGRAPHICALLY-CONSISTENT SEISMIC ATTRIBUTES

BACKGROUND

Seismic interpretation is a process by which recorded seismic traces are employed to determine the characteristics of a subterranean volume (or area). Seismic traces may be acquired using geophones positioned at different locations around a seismic source, which may be an explosion. The explosion may generate seismic waves that propagate through the earth. Some of the waves may propagate downward, until reflected by a reflector such as an interface between two types of rocks. The reflected waves may then propagate back to the surface, e.g., at a horizontal distance from the source. The geophones may measure the arrival of the seismic waves, and may produce one or more seismic traces therefrom.

The seismic traces may be arranged into a seismic cube (e.g., in three dimensions), which may represent the subterranean volume, including facies, strata, etc. in the rock through which the seismic waves propagate. An implicit function may be developed for the subterranean domain, based on the seismic data and any other available data (e.g., well logs, core samples, etc.). Various modeling techniques, e.g., fluid flow models, basin models, etc., may then be constructed from the seismic data, as well as any other data available for the volume (e.g., well logs, core samples, etc.).

Recently, there have been advances in seismic interpretation workflows, targeting the generation of an automatically-interpreted model of the subterranean domain. This may facilitate isolating a conformable surface corresponding to a certain geological age by selecting an iso-value within a stratigraphic function volume. These advances may generally seek to generate a Relative Geological Time (RGT) cube using the information contained in the seismic cube. To do so, the volume may have a high-level of detail, so that an interpreter may extract iso-value slices for topographical analysis.

SUMMARY

Embodiments of the disclosure may provide methods, systems, and computer-readable media for processing seismic data. For example, the method may include receiving a plurality of seismic traces representing a subterranean domain, and receiving an implicit stratigraphic model of at least a portion of the subterranean domain. The method may also include selecting an iso-value in the implicit stratigraphic model, and defining, using a processor, a geologically-consistent interval in the implicit stratigraphic model based at least partially on a position of the iso-value in the implicit stratigraphic model. The method may further include calculating one or more attributes of the plurality of seismic traces in the interval.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
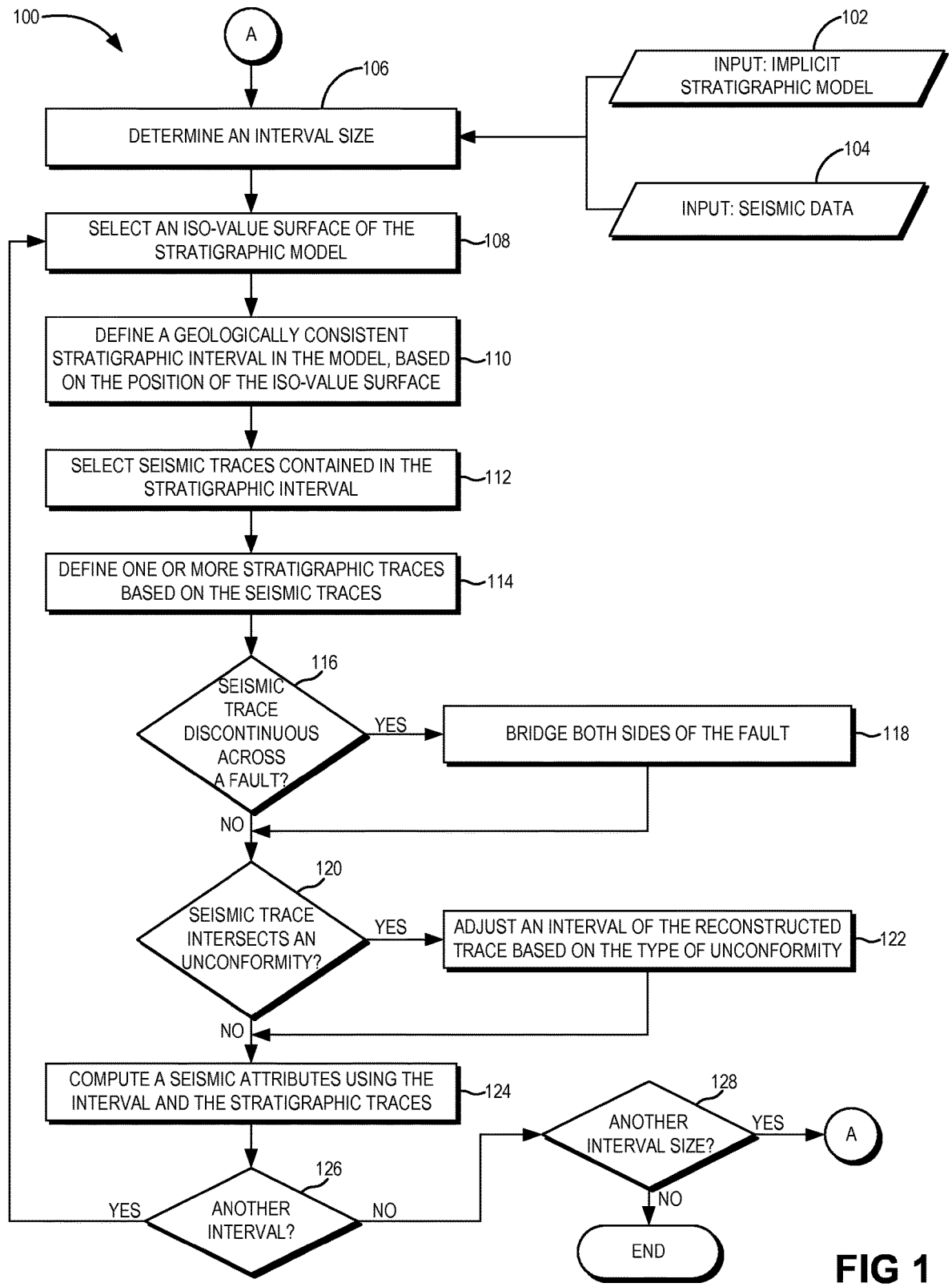
FIG. 1 illustrates a flowchart of a method for processing seismic data, according to an embodiment.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

FIG. 1 illustrates a flowchart of a method 100 for processing seismic data, according to an embodiment. In a specific embodiment, the method 100 may facilitate an interpretation of the seismic data, e.g., as part of the process of determining various seismic attributes. For example, the method 100 may facilitate the extraction of stratigraphically-consistent geometric, volume, and/or surface attributes of the seismic data. In some embodiments, the seismic attributes may be calculated based on geologically-consistent intervals around iso-value surfaces of an implicit model, as will be described in greater detail below. Although generally described in terms of three-dimensional data/models (e.g., with the iso-values being surfaces), it will be appreciated that embodiments of the method 100 may readily apply to two-dimensional data, or any other number of dimensions. Thus, the terms "domain" and "iso-value," as they are used herein, do not, by themselves, refer to any particular number of dimensions.

The attributes may be calculated using one or more computer processors executing instructions contained in one or more non-transitory computer-readable media. In addition, the method 100 may transform seismic data acquired from a physical domain into attributes, which may be visualized on a display device. These and other examples of aspects of the method 100, according to some embodiments, will become apparent with the aid of the following description.

Referring again to the embodiment illustrated in FIG. 1, the method 100 may include receiving inputs in the form of an implicit stratigraphic model, as at 102, and seismic data representing a volume or a section, e.g., a subterranean domain (of any number of dimensions), as at 104. The seismic data may include seismic traces, recorded from seismic waves that have propagated through the subterranean domain. Moreover, in some cases, the seismic data may have a grid or mesh associated therewith, e.g., to discretize the data according to time/depth and/or location in the subterranean domain, for various interpretation, simulation, and/or modeling process. In other cases, the seismic data may not be gridded.

The implicit stratigraphic function may be constructed in any suitable matter, and, for example, values derived using the function may be populated into the appropriate cells of the grid or mesh of the seismic cube. For example, an implicit modeling technique may be employed, which may include using one or more implicit functions. As an example, such a technique may include representing geological horizons in three-dimensions using specific iso-value surfaces of a scalar property field (e.g., an implicit function) defined on a three-dimensional background mesh. In other examples, the background mesh may have two-dimensions or any other number of dimensions. In such an example, continuity of the scalar field property may be governed by continuity of the background mesh.

The implicit modeling technique may include building (or receiving) a background mesh suitable for interpolating an implicit function, identifying a set of conformable sequences from the geological type of stratigraphic horizons, and editing the background mesh on which the interpolation is performed for processing of a first conformable sequence or between processing of two successive conformable sequences. This editing may include creating sub-volumes in the background mesh by subdividing it by previously-interpolated sequence boundaries, identifying sub-volumes corresponding to a "current" conformable sequence, and restricting further interpolation and iso-value surface extraction processes to the identified sub-volumes. Further, the editing may include, for example, managing fault activity in one or more of the identified sub-volumes, for example, by introducing and/or removing one or more internal discontinuities in the background mesh.

Further, the implicit stratigraphic modeling technique may include interpolating one or more implicit functions on a "conformable sequence per conformable sequence" basis, for example, optionally one conformable sequence at a time. An additional, non-limiting, discussion of conformable sequences is provided below. In other embodiments, the seismic domain may be processed on any other basis, and/or two or more conformable sequences may be considered in parallel.

The process of interpolating may proceed in any suitable matter, e.g., iteratively as considering the effects of boundary elements, etc. The implicit modeling method may output a mesh (e.g., or meshes). As an example, a mesh (e.g., or meshes) may be considered a model of a geologic environment.

It will be appreciated that the foregoing example of an implicit stratigraphic modeling technique is not to be considered limiting, but is merely one example among many such modeling techniques contemplated herein.

Returning to FIG. 1, the method 100 may include determining an interval size, as at 106. The interval size may be a geologically-consistent, e.g., time, interval in the implicit stratigraphic model. More particularly, in an embodiment, the interval may extend above and below a selected iso-value surface by a distance of □S, which may be a constant (or substantially constant) value in the units of the implicit stratigraphic model. For example, the □S units may be in geological age, whether relative or absolute, depending, e.g., on the processing/marking of the subterranean domain being modeled.

The size of the interval may be received as input from a user, in at least one embodiment. In other embodiments, the size of the interval may be predetermined, selected according to various overall attributes of the seismic data (resolution, variance, etc.). In still other embodiments, the method 100 may be iterative, as will be explained in greater detail below, and thus the size of the interval may be selected based at least partially on the size of the interval in a previous or subsequent iteration.

Before, during, or after determining the interval size, the method 100 may also include defining (e.g., selecting) an iso-value surface of the stratigraphic model, as at 108. The iso-value surface may represent a surface topography, as represented in the implicit model, having a generally uniform geologic or relative time value in the implicit model. The iso-value surface may be a two-dimensional surface, capturing one, some, or all points positioned at the geological (absolute or relative) time in the implicit function representing the subterranean domain.

Figure 2:
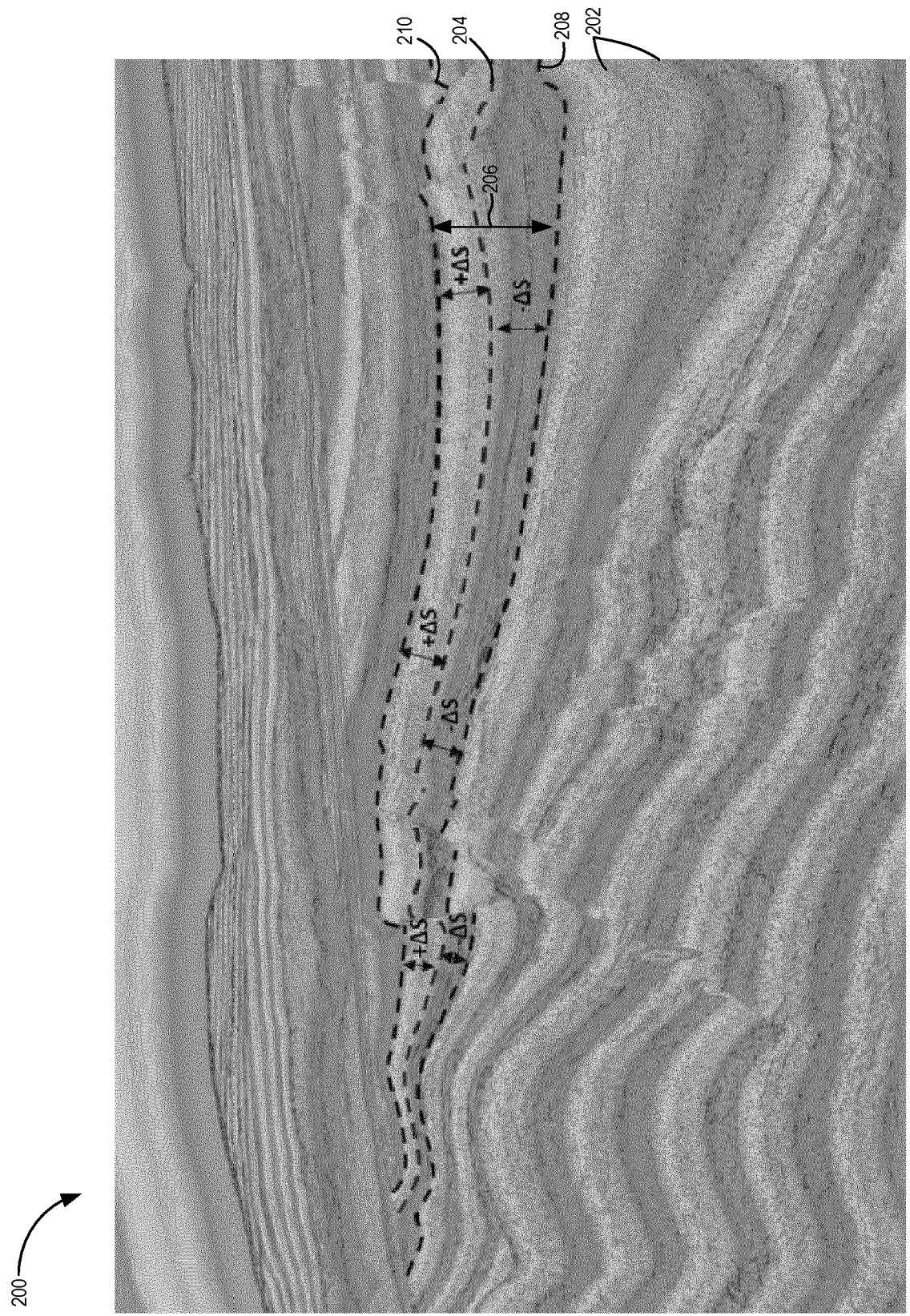
FIG. 2 illustrates a view of a model of a subterranean volume, incorporating a seismic cube and an implicit stratigraphic function/model of the volume, according to an embodiment.

FIG. 2 illustrates an example of a model 200 representing a seismic cube with an implicit stratigraphic function overlaid thereon (or at least overlapping therewith), according to an embodiment. As depicted, the model 200 includes iso-value surfaces 202, of which an iso-value surface 204 is selected at 108. As will be readily appreciated, the model 200 may be a visualization displayed on a computer display device.

The method 100 may include defining a geologically-consistent, stratigraphic interval in the model, based on the position of the iso-value surface, as at 110. For example, the interval may extend above and below the selected iso-value surface 204 by a distance (time) of magnitude □S. Referring again to FIG. 2, an interval 206 may be defined based on the position of the selected iso-value surface 204, e.g., above and below by the interval half-distance □S. Accordingly, the interval 206 may have a height of 2□S. Interval boundaries 208, 210 may be also be iso-value surfaces, established at a generally constant □S in the vertical direction from the selected iso-value surface 204. The interval boundaries 208, 210 may thus define the geologically-consistent interval 206 therebetween.

The method 100 may then proceed to selecting seismic traces contained in the stratigraphic interval, as at 112. In some embodiments, the data of the interval may include data other than, or in addition to, seismic traces, such as seismic attributes (e.g., amplitude, frequency, time, attenuation, variance, maximum, minimum, or average amplitude, etc.). Accordingly, although the illustrated example refers to selecting seismic traces, it will be appreciated that embodiments in which other types of data, which may or may not be seismic-based, are contemplated herein.

The method 100 may also include defining "stratigraphic traces" based on the seismic traces, as at 114. For example, the one or more seismic traces of the seismic cube may be selected by travelling perpendicular to or along a gradient of the stratigraphic function in the interval (e.g., interval 206). In various embodiments, this may include sampling one or more (e.g., several in three-dimensions) seismic traces in the seismic cube, and connecting portions of the seismic traces together.

In some embodiments, e.g., as part of defining the stratigraphic traces, the method 100 may include determining whether one or more of the seismic traces intersect a discontinuity (e.g., fault), as at 116. This determination may be made according to a fault mapping, the results of which may be provided as part of the implicit stratigraphic model. In response to a positive determination at 116, the method 100 may, at 118, include bridging both sides of the fault. For example, bridging at 118 may include selecting one seismic trace from either side of the fault. Thus, when, for example, calculating a root-mean-square of amplitude for a stratigraphic trace, the stratigraphic trace may consider both of the seismic trace portions taken from either side of the fault.

Selecting the seismic trace portions to put together and thus form the stratigraphic trace across a discontinuity (e.g., bridging at 118) may proceed in several different ways. For example, paleo coordinates (u, v) may be employed, a smallest fault-throw may be found, and/or user-defined orientations may be employed.

More particularly, for example, paleo-coordinates may computed as a separate process and may allow travel along an iso-stratigraphic surface, taking the fault displacement into account (e.g., the depospace may generate a pseudo-3D, chronostratigraphic representation of a structural model, where a Finite Element method may facilitate retro-calculating the fault displacement occurring through time). Further, the smallest throw for a point may be at the hanging/footwall of the horizon fault contact, which may be the shortest distance between this point and the corresponding footwall/hangingwall of the same horizon fault contact. In addition, a user could specify a single "azimuth" for the entire cube, which may represent the main axis of faulting (extentional or compressional). As such, a variety of such factors may be employed, alone or in combination, so as to select the seismic trace portions to put together in forming the stratigraphic trace.

Figure 3:
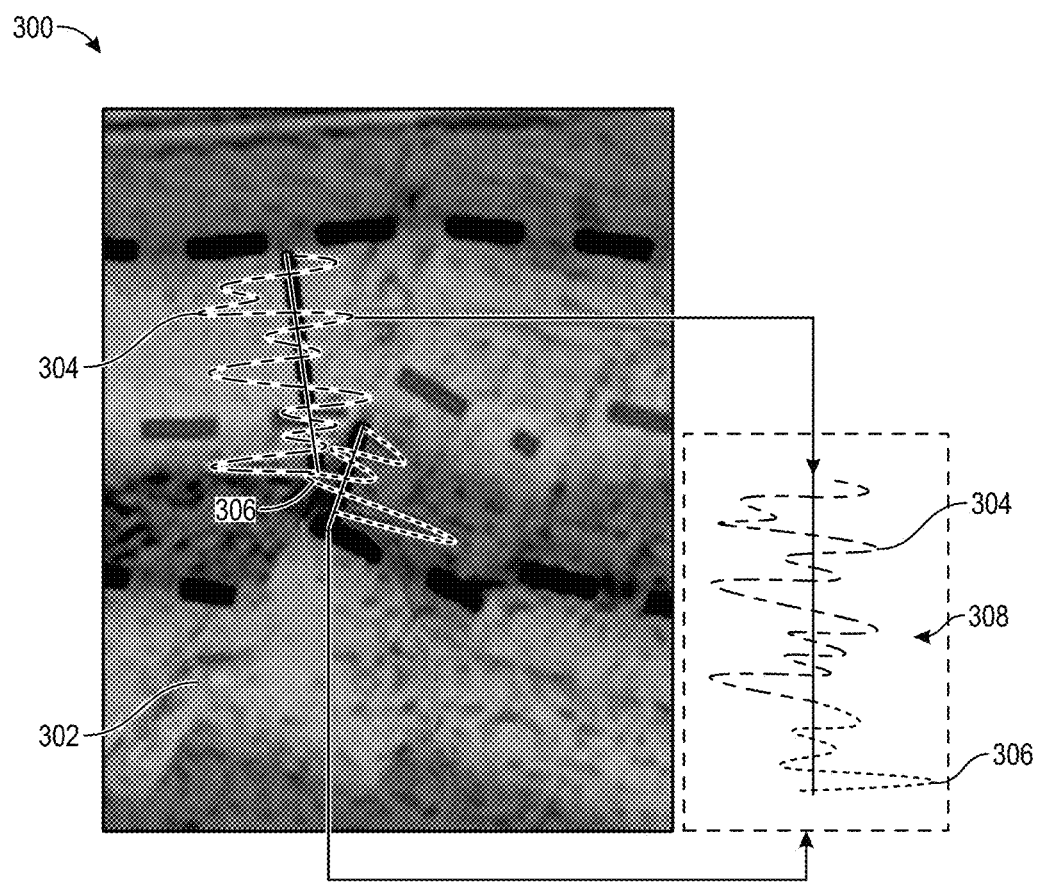
FIG. 3 illustrates an enlarged view of the model, showing a construction of a stratigraphic trace by combining two seismic traces on either side of a fault, according to an embodiment.

FIG. 3 illustrates an enlarged view of a portion 300 of the model 200, conceptually illustrating an example of bridging a fault 302 that is met by two seismic traces 304, 306, according to an embodiment. As shown, the fault 302 intersects the interval 206, resulting in the two seismic traces 304, 306 having different trajectories in the interval 206. When the two traces 304, 306 are selected for the bridging operation, e.g., based on the factors discussed above, the traces 304, 306 may be considered together as a single stratigraphic trace 308, e.g., for purposes of determining seismic (or other) attributes in the interval 206.

Referring again to FIG. 1, the method 100 may also include determining whether the seismic traces in the interval 206 cross a sequence boundary or "unconformity," as at 120. If it does, the method 100 may respond by adjusting the interval 206 with respect to the seismic trace intersecting the unconformity, so as to remove from consideration at least a portion of the seismic trace when constructing the stratigraphic trace. Stated otherwise, a portion of the seismic trace may be ignored if on the "wrong" side of the unconformity (e.g., with the unconformity between the selected iso-value surface and the portion of the seismic trace). In this way, geologic consistency may be maintained in the seismic attribute calculations, according to some embodiments, since rocks on different sides of an unconformity may have little or no geologic relevance to one another.

Figure 4:
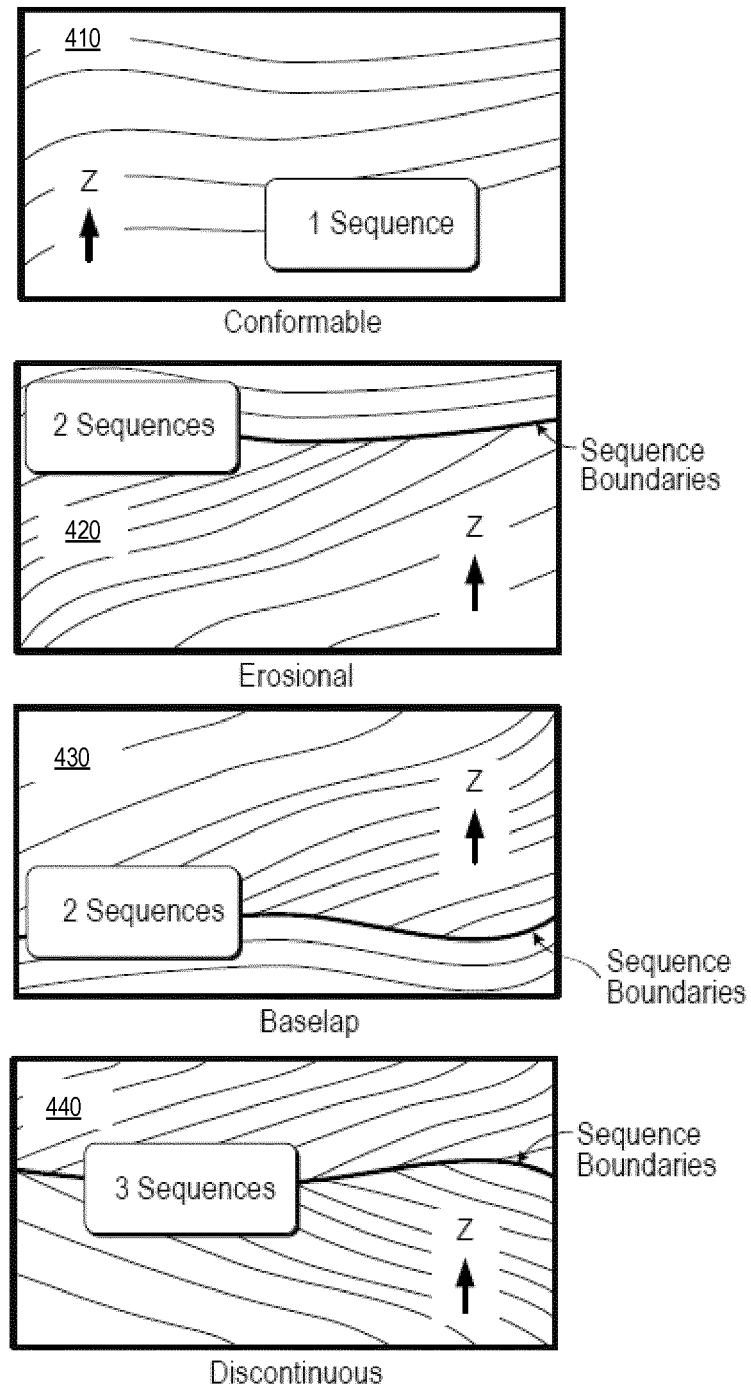
FIG. 4 illustrates views of unconformities that are considered in constructing the stratigraphic traces, according to an embodiment.
Figure 5:
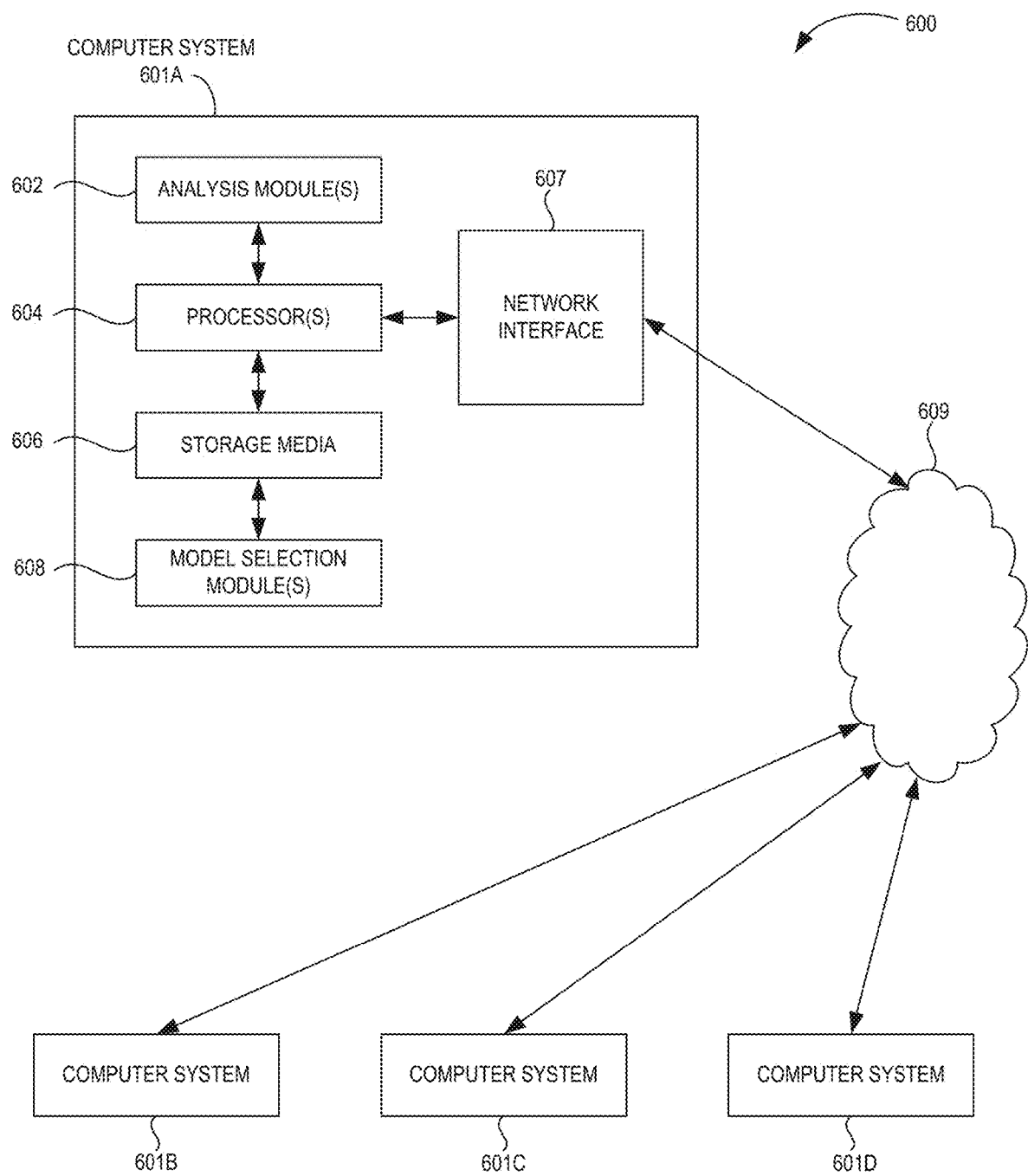
FIG. 5 illustrates a schematic view of a computing system, according to an embodiment.

FIG. 4 illustrates four types of sequences that may be considered, according to an embodiment. More particularly, illustrates are examples of formations that include one or more sequences, for example, sequences of sedimentary structures (e.g., strata, horizons, etc.) occurring in sedimentary rocks. As shown, a formation 410 may include a single sequence, formations 420 and 430 may each include two sequences, and a formation 440 may include three sequences, with the middle sequence being collapsed into a single discontinuity surface.

As an example, a conformable horizon may be a horizon between a lower horizon and an upper horizon where the horizons have undergone a relatively common geologic history, for example, being deposited in succession (e.g., continuous in time). Referring to the formation 410, the horizons do not intersect one another, and each of the horizons may be considered conformable to adjacent horizons (e.g., lower and upper or older and younger).

As an example, erosion may act to denude rock, for example, as a result of physical, chemical and/or biological breakdown and/or transportation. Erosion may occur, for example, as material (e.g., weathered from rock, etc.) is transported by fluids, solids (e.g., wind, water or ice) or mass-wasting (e.g., as in rock falls and landslides). Referring to the formation 420, of the two sequences shown, the lower sequence may have been eroded and the upper sequence deposited on top of the eroded lower sequence. In such an example, the boundary between the two sequences may be referred to as an erosion; noting that it is conformable to the upper, younger sequence. As an example, erosion may act to "truncate" a sequence of horizons and to form a surface upon which subsequent material may be deposited (e.g., optionally in a conformable manner).

As an example, a baselap may be a type of feature in a formation, for example, such as a downlap or an onlap. As an example, a downlap may be a termination of more steeply dipping overlying strata against a surface or underlying strata that have lower apparent dips. For example, a downlap may be seen at the base of prograding clinoforms and may represent progradation of a basin margin. As to an onlap, for example, it may be a termination of shallowly dipping, younger strata against more steeply dipping, older strata (e.g., sequence stratigraphy that may occur during periods of transgression). Referring to the formation 430, given the indicated direction "z" as depth, the type of baselap shown may be considered as a downlap (e.g., lower strata having lower apparent dips). In such an example, the baselap boundary is conformable to immediately older horizons (lower sequence).

As to the formation 440, it includes three sequences and may be referred to as a discontinuity, as the boundary is neither conformable to older horizons nor to younger ones. In the examples of FIG. 4, erosions, baselaps and discontinuities may be referred to as unconformities or non-conformable horizons (e.g., or surfaces, layers, etc.).

For example, when, as part of the method 100, it is determined that a stratigraphic trace (or a seismic trace that is to be reconstructed into part of a stratigraphic trace) intersects an erosion, the method 100 may constrain the interval 206 to the location of the iso-value surface 204 plus ΔS, e.g., effectively halving the interval 206 for the stratigraphic trace. In another embodiment, the method 100 may include shifting the interval 206 upwards. Further, the interval 206 size and/or position may be adjusted in any other way so as to avoid considering two sides of the erosion of the formation 420.

When the method 100 includes determining that the stratigraphic trace intersects a baselap, the method 100 may similarly constrain the interval 206, but, in this case, to the location of the iso-value surface 202 minus □S (or some multiple of □S). This may be done for the reverse reasons as shifting (and/or otherwise adjusting) the interval 206 when the stratigraphic trace intersects the erosion 402. That is, the rock above the baselap may not be consistent with, or relevant to, the rock above.

When the method 100 determines that the stratigraphic trace intersects a three-sequence discontinuity, the method 100 may omit the stratigraphic trace from further consideration of volumetric, seismic attributes in the interval 206. The stratigraphic trace above the rock may have little or no relation to the rock below, and vice versa, and thus volumetric attributes on the three-sequence discontinuity may not be calculated.

With the stratigraphic interval defined according to a geologically consistent interval 206, e.g., centered on or otherwise positioned based upon the selected iso-value surface 204, and the stratigraphic traces in the interval substituted for vertical or dip-oriented seismic traces, the method 100 may proceed to calculating one or more attributes (e.g., seismic, geometric, surface, etc.) in the interval 206 based on the stratigraphic traces, e.g., in three-dimensions, as at 124. Additionally, the method 100 may include displaying the calculated attributes, e.g., using a display screen (e.g. monitor, touchscreen, projector, etc.). The displayed attributes may represent a different conclusion that may be drawn based on the method 100 using geologically-consistent intervals for determining the attributes.

In addition, the method 100 may be iterative. Accordingly, the method 100 may determine whether additional intervals are to be considered, as at 126. If additional intervals are to be determined, the method 100 may return to selecting an iso-value at 108, which may be different from the iso-value surface previously defined. In this way, the method 100 may march through the intervals of the model 200 until all or a volume of interest thereof are considered. Further, in calculating some attributes, the calculated attributes for neighboring intervals may affect the calculation of at least a portion of the attribute of one another. Accordingly, the method 100 may iterate through to calculating the attribute at 124 one or more times using any or all of the intervals of the model 200 (or any portion thereof).

In addition, the method 100 may include adjusting the interval size, as at 128, effectively changing the size of the window for the windowed seismic attributes. This may enable more precise or more generalized attribute determinations.

Furthermore, using the stratigraphic function volume, embodiments of the method 100 may allow direct access to the topographic information. For example, any sampled stratigraphic trace in the volume may have an assigned value in the stratigraphic cube, allowing for an extraction of the stratigraphic trace in the cube with the same value to recreate a surface of common geological age. This can be correlated to a seismic event. Thus, the method 100 may include computing "surface attributes" directly, using the targeted seismic volume in combination with the stratigraphic function. The "surface attribute" may then be stored as a new seismic domain (e.g., volume). The surface attributes can then be extracted and re-stored as a child of a surface, or co-rendered on an iso-value of the stratigraphic function.

The method 100 may contain energy within a stratigraphic event, avoiding smearing the energy across discontinuities (faults or hiatuses). Such considerations may facilitate smoothing and/or noise cancellation processes.

Figure 6:
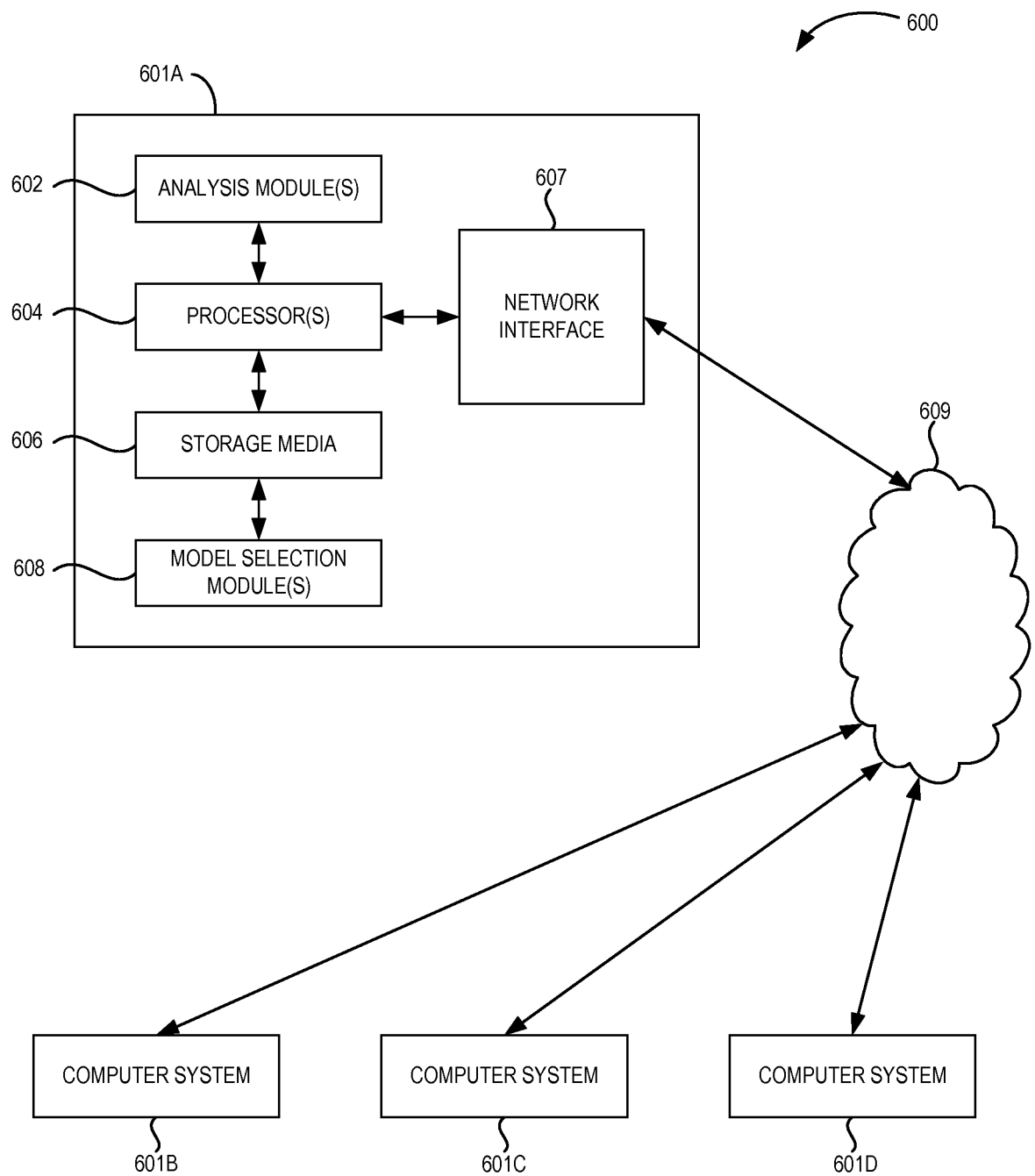

In some embodiments, the method 100 (and/or any of the processes thereof) may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein (e.g., methods 100, 500, and/or combinations and/or variations thereof). To perform these various tasks, the analysis module 602 executes independently, or in coordination with, one or more processors 604, which is (or are) connected to one or more storage media 606A. The processor(s) 604 is (or are) also connected to a network interface 607 to allow the computer system 601A to communicate over a data network 609 with one or more additional computer systems and/or computing systems, such as computing systems 601B, 601C, and/or 601D (note that computer systems 601B, 601C, and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor can include a microprocessor, microcontroller, processor module or subsystem, programmable integrated circuit, programmable gate array, or another control or computing device.

The storage media 606 can be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 600 contains one or more model selection module(s) 608. In the example of computing system 600, computer system 601A includes a modeling module 608. In some embodiments, a single modeling module may be used to perform some or all aspects of one or more embodiments of the method 100. In alternate embodiments, a plurality of modeling modules may be used to perform some or all aspects of method 100.

It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the various aspects of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The various aspects of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Moreover, geologic interpretations, models and/or other interpretation aids may be refined in an iterative fashion; this concept is applicable to the method 100, 500 as discussed herein. This can include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the order in which the aspects of the method 100 are performed may be re-arranged, without departing from the scope of the present disclosure. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for processing seismic data, comprising:
   receiving a plurality of seismic traces representing a subterranean domain;
   receiving an implicit stratigraphic model of at least a portion of the subterranean domain;
   selecting an iso-value in the implicit stratigraphic model;
   defining, using a processor, a geologically-consistent interval in the implicit stratigraphic model based at least partially on a position of the iso-value in the implicit stratigraphic model;
   constructing one or more stratigraphic traces oriented perpendicular to or along a gradient of a stratigraphic function on which the implicit stratigraphic model is based, wherein the one or more stratigraphic traces are constructed based on one or more of the plurality of seismic traces; and
   calculating one or more attributes of the plurality of seismic traces in the interval, wherein the one or more attributes are calculated based on the one or more stratigraphic traces.

2. The method of claim 1, wherein defining the geologically-consistent interval comprises:
   setting a first boundary offset from the iso-value by a first geological time; and
   setting a second boundary offset from the iso-value by a second geological time, wherein the interval is defined between the first and second boundaries.

3. The method of claim 2, wherein a magnitude of the first geological time is constant across the first boundary and is equal to a magnitude of the second geological time.

4. The method of claim 1, wherein constructing the one or more stratigraphic traces comprises:
   determining that a first seismic trace of the plurality of seismic traces and a second seismic trace of the plurality of seismic traces intersect a discontinuity; and
   in response, bridging the discontinuity by constructing the one or more stratigraphic traces from a combination of the first and second seismic traces, wherein the first and second seismic traces have different trajectories.

5. The method of claim 4, wherein bridging the discontinuity comprises selecting the first and second seismic traces for combination into the one or more stratigraphic traces based on paleo coordinates, fault-throw, a user-defined orientation, or a combination thereof.

6. The method of claim 1, wherein constructing the one or more stratigraphic traces comprises:
   determining that at least one of the plurality of seismic traces intersects an unconformity in the interval; and
   adjusting the interval with respect to the at least one of the plurality of seismic traces, such that the at least one of the plurality of seismic traces is only considered on one side of the unconformity.

7. The method of claim 1, further comprising displaying the one or more attributes using a display device.

8. The method of claim 1, further comprising:
   storing the one or more attributes as a new seismic domain; and
   extracting the one or more attributes as a child of the iso-value, or displaying the one or more attributes on an iso-value of the implicit stratigraphic model, or both.

9. A computing system, comprising:
   one or more processors; and
   a memory system comprising one or more non-transitory computer-readable media storing instructions that, when executed by at least one of the one or more processors, cause the computing system to perform operations, the operations comprising:
      receiving a plurality of seismic traces representing a subterranean domain;
      receiving an implicit stratigraphic model of at least a portion of the subterranean domain;
      selecting an iso-value in the implicit stratigraphic model;
      defining a geologically-consistent interval in the implicit stratigraphic model based at least partially on a position of the iso-value in the implicit stratigraphic model;
      constructing one or more stratigraphic traces based on the implicit stratigraphic model and a plurality of seismic traces at least partially in the interval, wherein constructing comprises:
         determining that at least one of the plurality of seismic traces intersects an unconformity in the interval; and
         adjusting the interval with respect to the at least one of the plurality of seismic traces, such that the at least one of the plurality of seismic traces is only considered for inclusion in the one or more stratigraphic traces on one side of the unconformity; and
      calculating one or more attributes of the plurality of seismic traces in the interval, wherein the one or more attributes are calculated based on the one or more stratigraphic traces.

10. The system of claim 9, wherein defining the geologically-consistent interval comprises:
   setting a first boundary offset from the iso-value by a first geological time; and
   setting a second boundary offset from the iso-value by a second geological time, wherein the interval is defined between the first and second boundaries.

11. The system of claim 10, wherein a magnitude of the first geological time is constant across the first boundary and is equal to a magnitude of the second geological time.

12. The system of claim 9, wherein the one or more stratigraphic traces are oriented perpendicular to or along a gradient of a stratigraphic function on which the implicit stratigraphic model is based.

13. A non-transitory computer-readable medium storing instructions that, when executed by one or more processors of a computing system, cause the computing system to perform operations, the operations comprising:
   receiving a plurality of seismic traces representing a subterranean domain;
   receiving an implicit stratigraphic model of at least a portion of the subterranean domain;
   selecting an iso-value in the implicit stratigraphic model;
   defining a geologically-consistent interval in the implicit stratigraphic model based at least partially on a position of the iso-value in the implicit stratigraphic model;
   constructing one or more stratigraphic traces oriented perpendicular to or along a gradient of a stratigraphic function on which the implicit stratigraphic model is based, wherein the one or more stratigraphic traces are constructed based on one or more of the plurality of seismic traces; and
   calculating one or more attributes of the plurality of seismic traces in the interval, wherein the one or more attributes are calculated based on the one or more stratigraphic traces.

14. The medium of claim 13, wherein defining the geologically-consistent interval comprises:
   setting a first boundary offset from the iso-value by a first geological time; and
   setting a second boundary offset from the iso-value by a second geological time, wherein the interval is defined between the first and second boundaries.

15. The medium of claim 13, wherein constructing the one or more stratigraphic traces comprises:
   determining that a first seismic trace of the plurality of seismic traces and a second seismic trace of the plurality of seismic traces intersect a discontinuity; and
   in response, bridging the discontinuity by constructing the one or more stratigraphic traces from a combination of the first and second seismic traces, wherein the first and second seismic traces have different trajectories.

16. The medium of claim 13, wherein constructing the one or more stratigraphic traces comprises:
   determining that at least one of the plurality of seismic traces intersects an unconformity in the interval; and
   adjusting the interval with respect to the at least one of the plurality of seismic traces, such that the at least one of the plurality of seismic traces is only considered on one side of the unconformity.

\* \* \* \* \*